US008581602B2

(12) United States Patent
Bray et al.

(10) Patent No.: US 8,581,602 B2
(45) Date of Patent: Nov. 12, 2013

(54) METHOD AND APPARATUS FOR NONDESTRUCTIVE MEASURING OF A COATING THICKNESS ON A CURVED SURFACE

(75) Inventors: Alan V. Bray, Spicewood, TX (US); Matthew Lindsey, Austin, TX (US)

(73) Assignee: Systems and Materials Research Corporation, Austin, TX (US)

( * ) Notice: Subject to any disclaimer, the term of this patent is extended or adjusted under 35 U.S.C. 154(b) by 384 days.

(21) Appl. No.: 12/851,439

(22) Filed: Aug. 5, 2010

(65) Prior Publication Data

US 2011/0050248 A1 Mar. 3, 2011

Related U.S. Application Data

(60) Provisional application No. 61/239,323, filed on Sep. 2, 2009.

(51) Int. Cl.
G01R 27/04 (2006.01)
G01R 27/32 (2006.01)

(52) U.S. Cl.
USPC .......................................... 324/644; 324/642

(58) Field of Classification Search
USPC ................................. 324/644, 642
See application file for complete search history.

(56) References Cited

U.S. PATENT DOCUMENTS

| | | | | |
|---|---|---|---|---|
| 4,536,063 | A * | 8/1985 | Southwell | 359/485.03 |
| 5,038,615 | A * | 8/1991 | Trulson et al. | 73/597 |
| 5,216,372 | A | 6/1993 | Zoughi et al. | |
| 5,539,322 | A | 7/1996 | Zoughi et al. | |
| 6,005,397 | A | 12/1999 | Zoughi et al. | |
| 6,120,833 | A * | 9/2000 | Bonnebat et al. | 427/10 |
| 6,399,944 | B1 | 6/2002 | Vasilyev et al. | |
| 6,462,561 | B1 | 10/2002 | Bigelow et al. | |
| 6,674,292 | B2 | 1/2004 | Bray et al. | |
| 7,339,382 | B1 * | 3/2008 | Bray et al. | 324/644 |
| 2003/0078498 | A1 * | 4/2003 | Lang et al. | 600/437 |
| 2006/0164104 | A1 * | 7/2006 | Tada et al. | 324/646 |

OTHER PUBLICATIONS

Bray, Alan V., et al., 'Microwave Corrosion Detectors (MCDS) for Inspecting Under Aircraft Paints and Appliques,' 2002 Tri-Service Corrosion Conference, Jan. 14-18, 2002, 13 pages.
Schimdt, Gary R., et al., 'Microwave Corrosion Detector for Inspecting Under Aircraft Paints and Appliques,' Army Corrosion Summit, Mar. 7, 2002, 25 pages.
Hinken, Johann H., et al., 'Contactless Thickness Measurements of Glass Walls by Using Microwave Reflections,' ECNDT 2006, 7 pgs.

(Continued)

*Primary Examiner* — Jeff Natalini
(74) *Attorney, Agent, or Firm* — Abel Law Group, LLP; David D. Griner

(57) ABSTRACT

An improved method and apparatus for non-destructive measurements of coating thicknesses on a curved surface by measuring components of the microwave energy reflected from the surface. Preferred embodiments of the present invention provide a portable microwave thickness detector with a rounded rocker-type base allowing the microwave beam to be moved through a range of angles with respect to the target surface. An optical alignment system determines when the microwave angle of incidence is at a desired angle when the components of the reflected microwave energy are measured. Preferred embodiments of the present invention also provide a portable microwave thickness detector which maintains a constant standoff distance between the between the microwave detector and the sample to be measured.

15 Claims, 9 Drawing Sheets

(56) References Cited

OTHER PUBLICATIONS

Prouty, Malcolm D., 'Robotic Coating Thickness Measurement System,' NAVAIR Public Release 2008, 7 pgs.

Sohns, C. W., et al., 'Microwave Based Civil Structure Inspection Device,' 1994 Spring Meeting of the Materials Research Society, Apr. 5, 1994, 17 pgs.

* cited by examiner

METHOD AND APPARATUS FOR NONDESTRUCTIVE MEASURING OF A COATING THICKNESS ON A CURVED SURFACE

This application claims priority from U.S. Provisional Application 61/239,323, filed Sep. 2, 2009, which is hereby incorporated by reference.

TECHNICAL FIELD OF THE INVENTION

The present invention relates to thickness measurements of coatings, such as paints and appliqués, using microwaves, particularly to measurements of coating thickness on curved surfaces.

BACKGROUND OF THE INVENTION

Coatings are used in a wide variety of applications to protect underlying structures from their environments. For example, coatings can be used to resist corrosion, to provide thermal insulation, to prevent mechanical damage, to reduce radar observability, or to protect from lightning strikes. Coatings include, for example, paint and polymer-based appliqués, which are being considered by military and commercial aviation operators as an alternative to paint. In aviation, for example, the thickness of coatings such as those used on airplane propellers and helicopter blades are required to be maintained within a certain range that is thick enough to allow for corrosion resistance, but thin enough to allow for the use of de-icing technology.

As inadequate coating can reduce the protection offered to underlying structures, and excessive coating can be expensive, particularly where hi-tech coatings are concerned, such as those coatings with low observable characteristics favorable for use on stealth aircraft. An extra few thousandths of an inch of unnecessary coating thickness can add significant expense to the manufacturing process for an aircraft part. Excess coating can also lead to unnecessary added weight or, in the case of airplane propellers or helicopter blades, an unbalanced rotating assembly. Because a propeller or helicopter blade is sensitive to balance, the stability of the rotating mass is subject to the consistency of the coating thickness applied throughout its surface area.

Measuring coating thickness, therefore, is desirable and often critical in order to determine proper coating thickness particularly of curved surfaces such as, for example, those of airplane propellers or helicopter blades. Additionally, in applications relating to measuring the thickness of hi-tech coatings used in aircraft and spacecraft, fast, accurate measurements are also critical.

Microwaves can be used to measure the thickness of paint and other coatings, as described in U.S. Pat. No. 7,339,382, to Bray et al. for "Apparatuses and Methods for Nondestructive Microwave Measurement of Dry and Wet Film Thickness," which is hereby incorporated by reference. Bray describes the use of microwaves for measuring film thickness by comparing properties of reflected waves from a sample to properties of reflected waves calibrated by passing the waves through films of known thicknesses.

Prior art microwave thickness measurement methods take advantage of the way in which incident radiation interacts with layered dielectric media. Microwave energy is directed from a microwave source toward a coating, such as paint or appliqué, over a target substrate. A portion of the microwave energy is reflected from the target surface underneath the coating to be measured. The thickness and dielectric properties of the coating through which the microwaves pass affect the properties of the microwaves. The reflected microwaves combine with the primary waves to form a standing wave pattern. Preferred embodiments determine the quadrature components of a reflected wave, which quadrature components are then correlated to coating thickness, preferably using correlation data determined from calibration standards.

As the dielectric characteristics under the aperture of the antenna change, the reflected signal changes. On an aircraft, the layers of materials over bright aluminum typically include an anti-corrosion coating, a primer coating, and a topcoat or an appliqué. These dielectric layers affect the transmission characteristics of the microwave signal in a relatively constant fashion on the skin of the aircraft.

FIG. 1 shows a prior art device used to measure coating or film thickness on a substrate 30. A microwave oscillator/transmitter 12 is the source of microwave energy for the device 10 and should generally be matched to a waveguide 16 in frequency. A reflected energy separator 14, such as a three-port circulator, can be used to separate reflected microwave signal from the incident microwave signal. A circulator typically uses a ferrite material biased by a DC magnetic field, which routes microwaves differently depending on the direction of propagation. This allows the reflected waves, traveling back, to be separated from the primary waves, traveling forward. The reflected wave quadrature components can thus be measured directly. In-phase detector diode 18 and quadrature diode 19 can sense radiated microwave energy and convert it into an electrical signal. The thickness of the coating 26 on a substrate 30 will be proportional to the phase of the reflected microwave signal.

As discussed in greater detail below, the phase of the reflected signal will be dependent on the analog outputs of these two diodes in quadrature with each other. The standoff distance 24 (the distance between the microwave sensor/detector and the target) must be maintained at a constant value because variations in the distance between the microwave sensor (indicated by dashed line 20) and the target surface (indicated by dashed line 22) can cause significant changes in measurement results, as described below. As used herein, the term "standoff distance" will refer to the distance between the microwave sensor/detector and the target.

Prior art measurement methods and devices suffer from a number of shortcomings. Such devices are typically large and bulky and are accordingly difficult to use in the field for spot checking thicknesses. Typically, truck assemblies or robotic control are required to maintain constant liftoff/standoff distances. Further, existing devices are very difficult to use on sharply curved surfaces such as helicopter blades and airplane propellers.

Accordingly, what is needed is an improved method and apparatus for non-destructive measurements of coating thicknesses that is both portable and easy to use on curved surfaces.

SUMMARY OF THE INVENTION

An object of the invention, therefore, is to provide an improved method and apparatus for non-destructive measurements of coating thicknesses on curved surfaces. Coating thickness can be determined by measuring components of reflected microwave energy and comparing the values for a coating of an unknown thickness to stored calibration data. Because variations in microwave angle of incidence can have a significant effect upon the accuracy and repeatability of such measurements of coating thickness, preferred embodiments of the present invention provide an optical alignment system to determine when the microwave angle of incidence is at a desired angle when measurements are made. A portable microwave thickness detector with a rounded rocker-type base according to the present invention allows the microwave beam to be easily and repeatably moved through a range of angles with respect to the target surface. When the optical alignment system indicates that the microwave beam is at the desired angle, the components of the reflected microwave energy can be measured and used to determine the coating thickness by comparing the measured components of the sample to stored calibration data. Preferred embodiments of the present invention also provide a portable microwave thickness detector which maintains a constant standoff distance between the between the microwave detector and the sample to be measured.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION OF PREFERRED EMBODIMENTS

Figure 1:
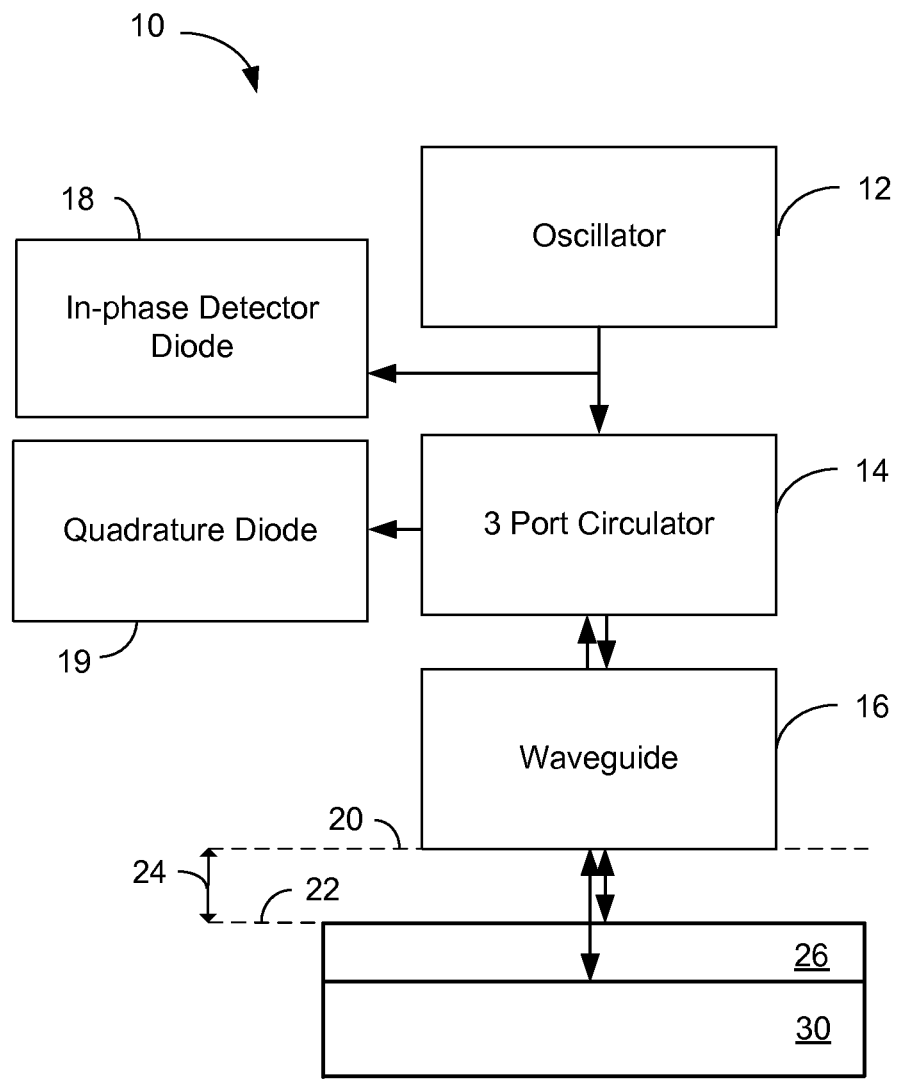
FIG. 1 shows a prior art microwave measurement tool.

For quality control, process monitoring, and cost control, it is desirable to have a method of non-destructive evaluation (NDE) of coating thickness on the surfaces of structures, such as surfaces associated with vessels, aircraft, and buildings. Coating thickness can be determined by using a Microwave Thickness Detector (MTD) to measure components of reflected microwave energy and then comparing the values for a coating of an unknown thickness to stored calibration data. Microwave energy is first directed from a microwave source toward the coating. A portion of the microwave energy passes through the coating and is reflected from the target surface underneath the coating to be measured. The thickness and dielectric properties of the coating through which the microwaves pass affect the properties of the microwaves. The reflected microwaves combine with the primary waves to form a standing wave pattern. The quadrature components of the reflected wave can be measured and correlated to layer thickness, preferably using correlation data determined from calibration standards.

As microwave energy is directed toward a surface, the reflected signal will have an angle of reflection that is equal to the angle of incidence. Thus, with a relatively small handheld device, if the microwave energy is directed at the surface at an angle, the reflected microwaves may not be completely collected. Further, because the phase angle of the reflected signal is based upon the distance traveled, it is highly desirable that the signals be transmitted and collected at a constant and repeatable angle.

Thus, it is highly desirable that measurements be taken at a constant angle, preferably when the microwave beam is orthogonally to the surface (i.e., when the microwave is perpendicular/normal to the surface). This can be particularly problematic when measuring the coating thickness on curved surfaces, particularly sharply curved surfaces such as helicopter blades and airplane propellers which have a radius of curvature down to 1.5 inches. As used herein, a "curved surface" is any non-planar surface where an operator would not be able to position a prior art MTD at a desired angle to the target surface with a satisfactory degree of accuracy or repeatability.

In order to insure that the microwaves are transmitted and collected at a constant and repeatable angle, preferred embodiments of the present invention use an optical alignment system to determine when the microwave angle of incidence is at a desired angle when the components of the reflected microwave energy are measured. A portable microwave thickness detector with a rounded rocker-type base allows the microwave beam to be easily and repeatably moved through a range of angles with respect to the target surface. When the optical alignment system indicates that the microwave beam is at the desired angle, the components of the reflected microwave energy can be measured and used to determine the coating thickness by comparing the measured components of the sample to stored calibration data. Preferred embodiments of the present invention also provide a portable microwave thickness detector which maintains a constant standoff distance between the between the microwave detector and the sample to be measured.

A preferred method or apparatus of the present invention has many novel aspects, and because the invention can be embodied in different methods or apparatuses for different purposes, not every aspect need be present in every embodiment. Moreover, many of the aspects of the described embodiments may be separately patentable. Preferred embodiments of the present invention are particularly adapted for the measurement of coating thickness on curved surfaces, such as helicopter blades and airplane propellers. The terms "film," "coating," and "layer" are used interchangeably herein to mean any layer or covering on the surface of a target (such as paint, appliqué, an oxide layer, etc.) however it is formed on the surface.

Figure 2:
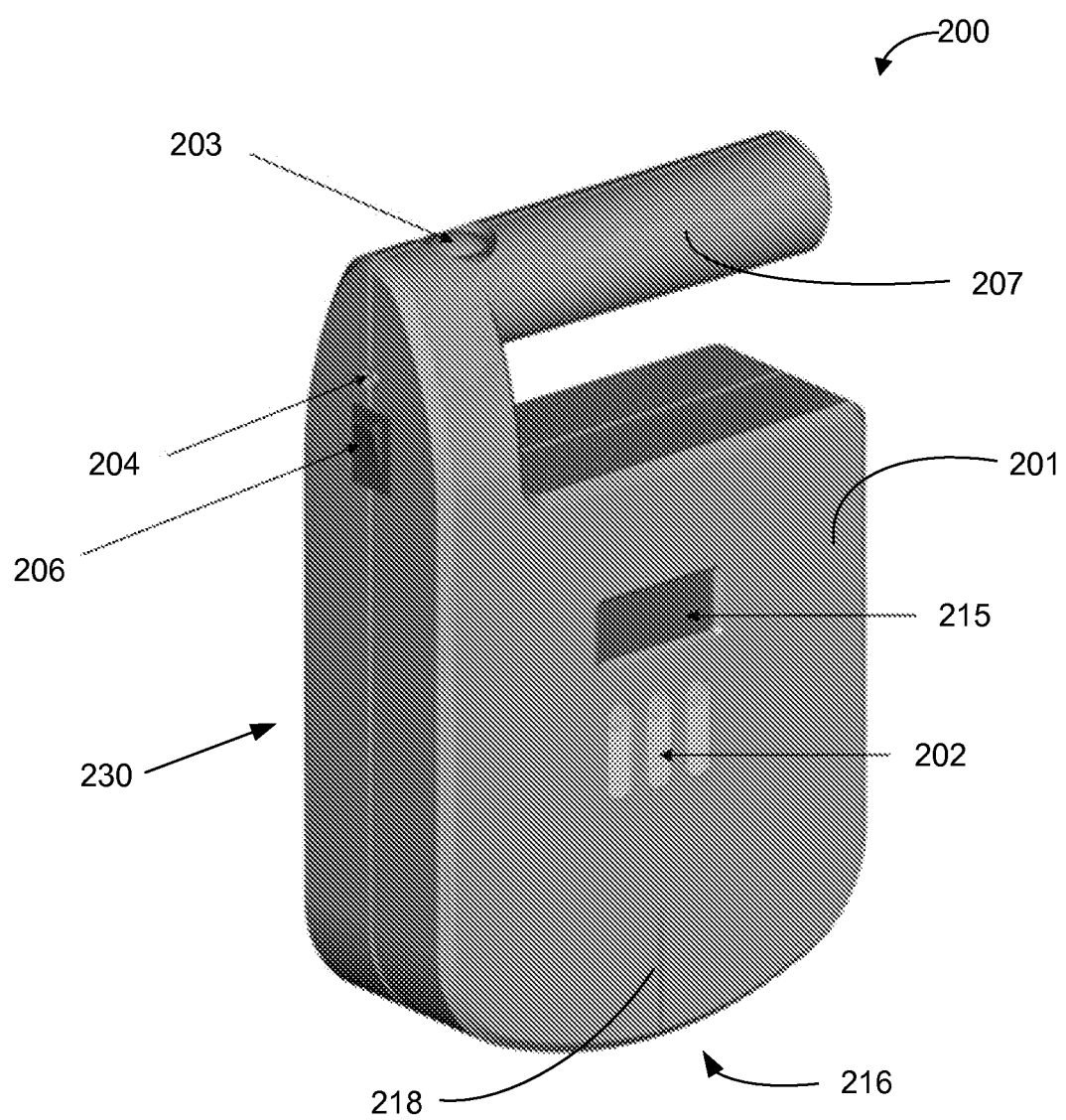
FIG. 2 shows a perspective view of a preferred embodiment of a rocker-type microwave thickness detector according to the present invention.
Figure 3A:
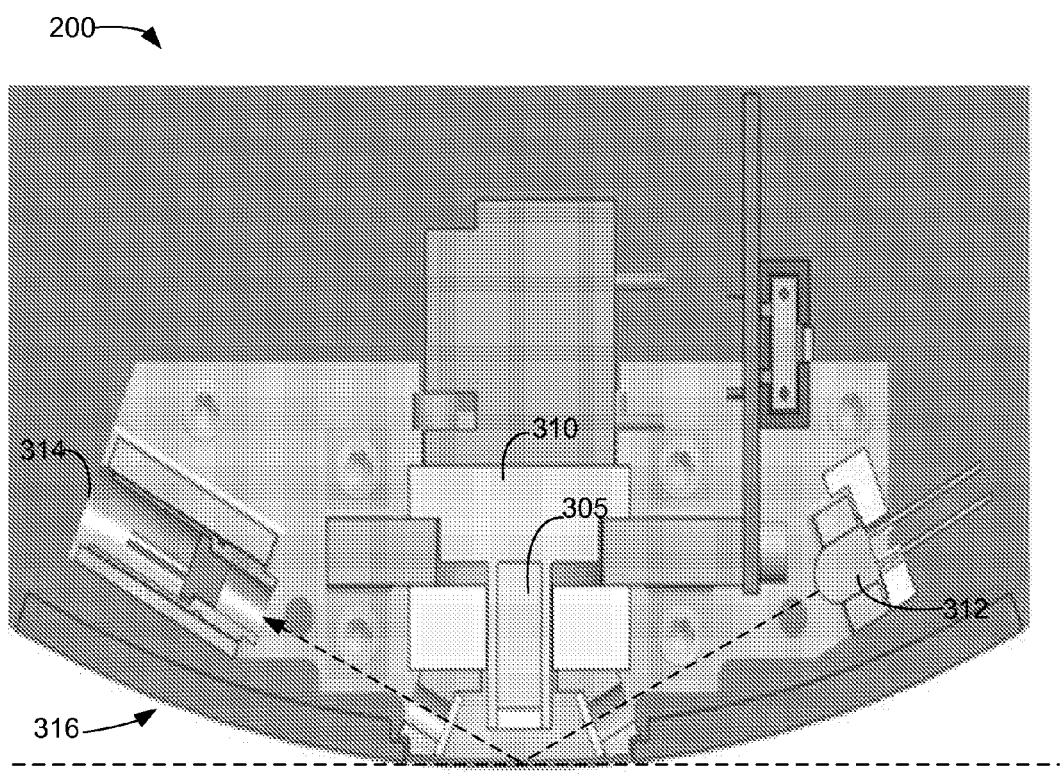
FIG. 3A illustrates various internal components of the inspection tool of FIG. 2 particularly the nondestructive evaluation sensor and illumination alignment device.

FIG. 2 shows a handheld portable Microwave Thickness Detector ("MTD") 200 suitable for measuring coating/layer thickness on a curved surface according to the present invention. Portable MTD 200 preferably generates microwaves and measures the reflected waves in a fashion similar to that described in U.S. Pat. Nos. 6,674,292 and 7,339,382, which are both assigned to the assignee of the present invention and hereby incorporated by reference. Referring also to FIG. 3A showing internal components of the portable MTD 200, microwave assembly 305 and detection circuitry 310 are housed within the housing 201 (shown in FIG. 2)—as well as illumination source 314 and optical detector 312 described below.

The microwave assembly 305 preferably includes the components shown in FIG. 1 and as described above in relation to FIG. 1, including a microwave oscillator/transmitter 12 and a detector diodes 18, 19. Microwave oscillator/transmitter 12 is the source of microwave energy for the device 200 and should generally be matched to a waveguide 16 in frequency. A reflected energy separator 14, such as a three-port circulator, can be used to separate reflected microwaves from the incident microwave signal. This allows the reflected wave quadrature components to be measured directly. In-phase detector diode 18 and quadrature diode 19 can sense radiated microwave energy and convert it into an electrical signal.

Because the base of the portable MTD is preferably placed directly against the target surface, the standoff distance between the microwave detector and the top surface remains constant (as long as a constant measurement angle is used). Thus, the distance between the microwave sensor and the underlying reflective or partially reflective surface signal will vary with the thickness of the coating. The dielectric coating layer causes a change in the quadrature components of the reflected wave, as indicated by the sensor I and Q outputs, and shifts the standing wave pattern. The change can be used to determine thickness or dielectric properties of the material comprising the coating.

However, especially when coating/layer thickness on a curved surface is being measured, it is difficult to insure that the angle of incidence between the microwave beam and the target surface remains constant. Variations in this angle of incidence between calibration samples and a test site can result is significant errors in thickness determination. To eliminate, or reduce these errors, it is highly desirable that the microwave beam be oriented perpendicular to the target surface. Preferred embodiments of the present invention accomplish this by way of a rounded rocker-type base and a laser alignment system.

As shown in FIG. 3A, portable MTD includes illumination source 314 and optical detector 312. In a preferred embodiment, the illumination source 314 is a laser diode, such as one that is utilized in an optical laser scanner. Optical laser scanners generally employ a laser diode, a multifaceted polygonal minor, focusing optics and a detector. Optionally, a non-laser light source/detector system may be used, such as a non-laser light source and a charge-coupled device (CCD) light detecting means, such as a CCD linear sensor. Laser and CCD illumination sources and optical detectors are known in the art, and typically include those used in barcode scanning devices.

The positioning of the illumination source and the optical detector is preferably dependent on specular reflection. In other words, the angle of the emitted illumination to the microwave energy source is equal to the angle of the optical detector to the microwave energy source, that is, the angle of the incident ray is equal to the angle of the reflected ray. It is preferred that the illumination source and the detector are placed at a constant angle with respect to each other. A laser beam produced by the illumination source is directed at the surface. The beam will reflect from the surface with the angle of reflection equal to the angle of incidence at the surface tangent of the target. If the MTD and the illumination source are positioned so that the angle between the illumination source and detector are equal relative to a vector with the vector's tail at the point of measurement over the target surface and the vector's head located at the center line of the longitudinal axis of the laser emitter or detector, the beam will strike the detector. At other angles, however, the beam will not strike the detector. The microwave device is preferably positioned in the center of the angle between the illumination source and detector so that when the beam reflected from the surface strikes the detector, the microwave beam will be perpendicular to the surface.

The housing 201 includes a curved lower surface 216 (reference numeral 316 as depicted also in FIG. 3A) that allows the MTD 200 to be rocked in a lateral direction over a surface. The housing 201 also preferably includes a midpoint indicator 218 that may be, for example, an indentation or other marking that indicates closely the position and orientation of the internal microwave assembly 305 (also referred to herein as the vertical axis of the MTD) shown in FIG. 3A.

Figure 3B:
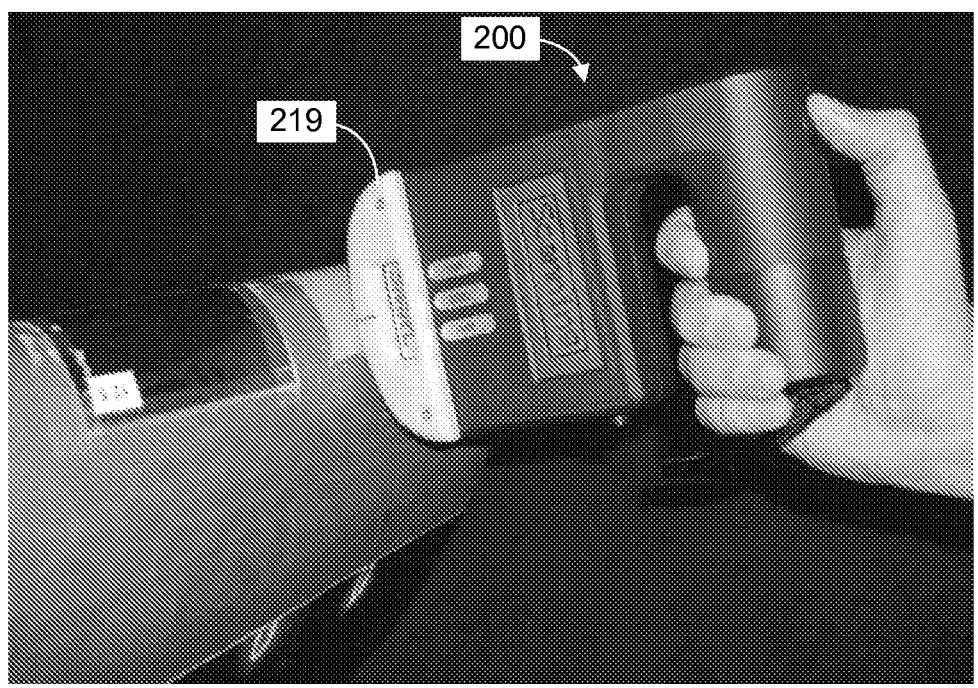
FIG. 3B shows a microwave thickness detector (MTD) device in use according to a preferred embodiment of the present invention.

Housing 201 for the MTD 200 can take many portable forms, but preferably includes a curved lower surface 216 that allows the MTD to be "rolled" over a target surface so that the vertical axis of the MTD passes though a position that is perpendicular to the target surface at the surface point impacted by the microwave beam. The MTD housing preferably provides two additional functions: (1) it enables an easy, well balanced, scanning motion and; (2) it keeps the microwave sensor within a specified standoff distance of the target surface being measured. Referring also to FIG. 3B, in some embodiments, the microwave and laser sensing hardware shown in FIG. 3A can be contained in a removable "foot" 219 that is easily disconnected from the handle portion of the housing.

Figure 4A:
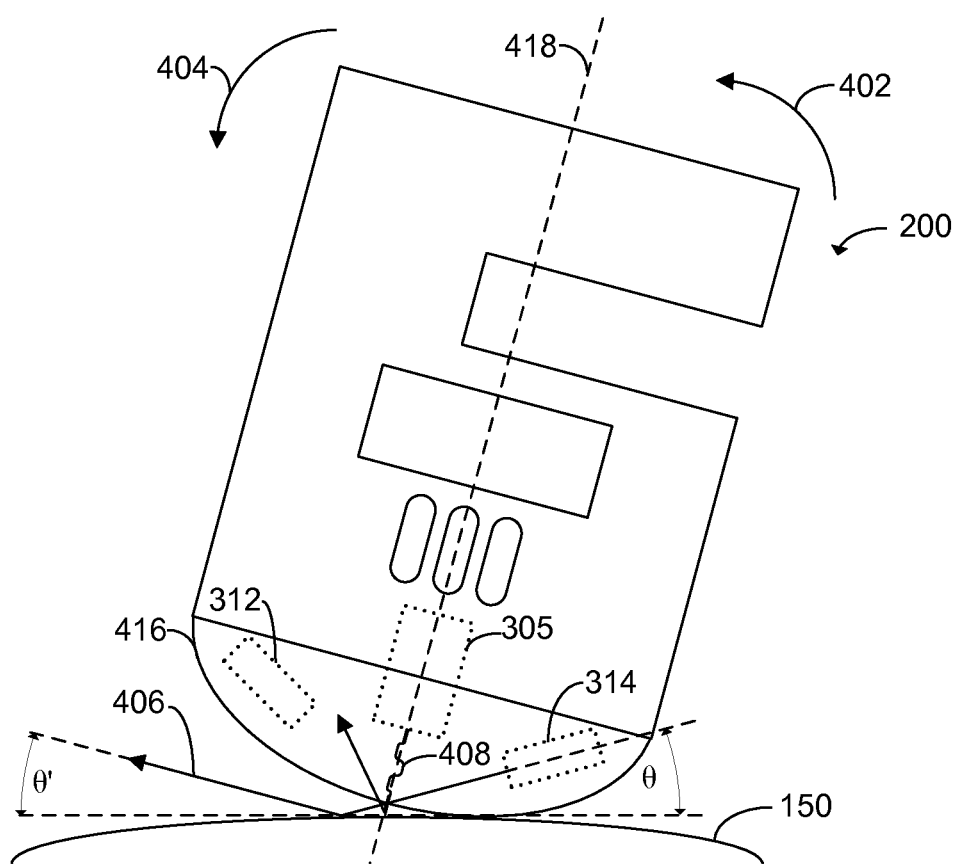
FIGS. 4A and 4B show schematic drawings of a microwave thickness detector according to the present invention in use.
Figure 4B:
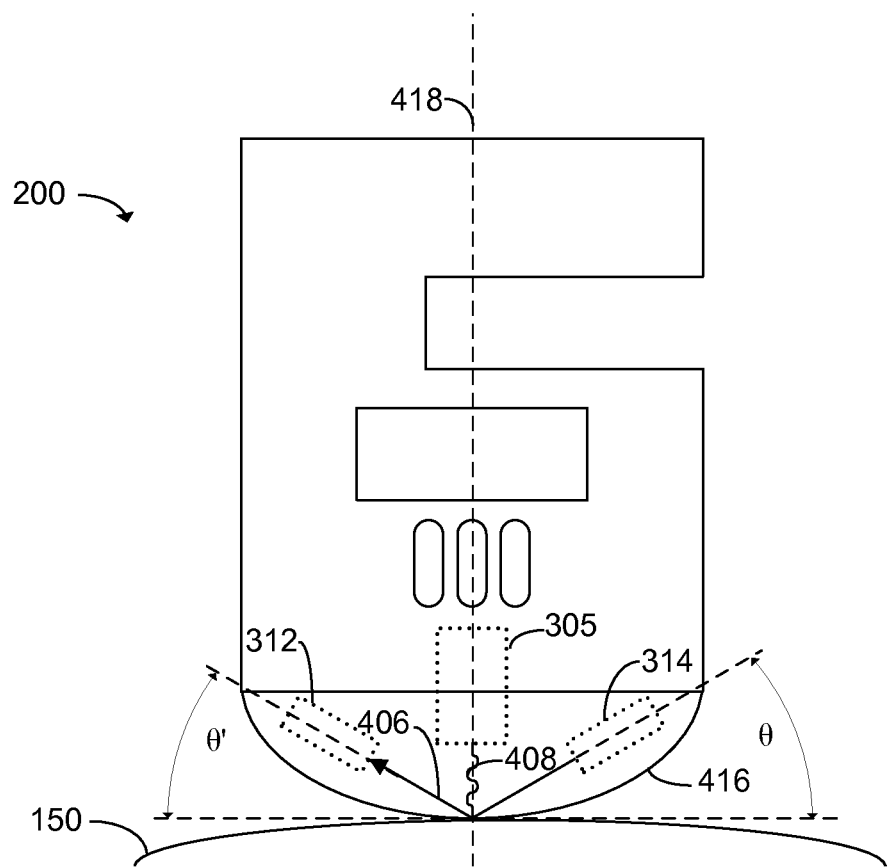

FIGS. 4A and 4B show schematic drawings of an MTD according to the present invention being operated on a target surface. To obtain a measurement using the MTD, the base of the rocker assembly is placed in contact with the target surface as shown in FIG. 4A so that the vertical axis of the MTD forms an acute angle (in a lateral direction) with the target surface. The illumination source and the microwave transmitter are activated to produce a laser beam 406 and a microwave beam 408, with both beams striking the target surface. The MTD is then rolled laterally along the curved lower surface in a scanning motion from one side to the other in the direction shown by arrows 402 and 404, so that the vertical axis of the MTD passes through a point where it is perpendicular to the target surface. This causes the contact area between the curved lower surface 216 and the target surface to move from the right side of the rocker (in the orientation shown in FIGS. 4A and 4B) to the midpoint of the rocker and then beyond. In other words, the surface area of the lower curved surface 216 (416 in FIGS. 4A and 4B) is rolled laterally from one side of the midpoint 218 (418 in FIGS. 4A and 4B) to the other side of the midpoint in contact with the target surface 150 (as shown in FIGS. 4A and 4B) in a, preferably, single direction motion. FIG. 3B shows a MTD being rolled over a surface.

Figure 5:
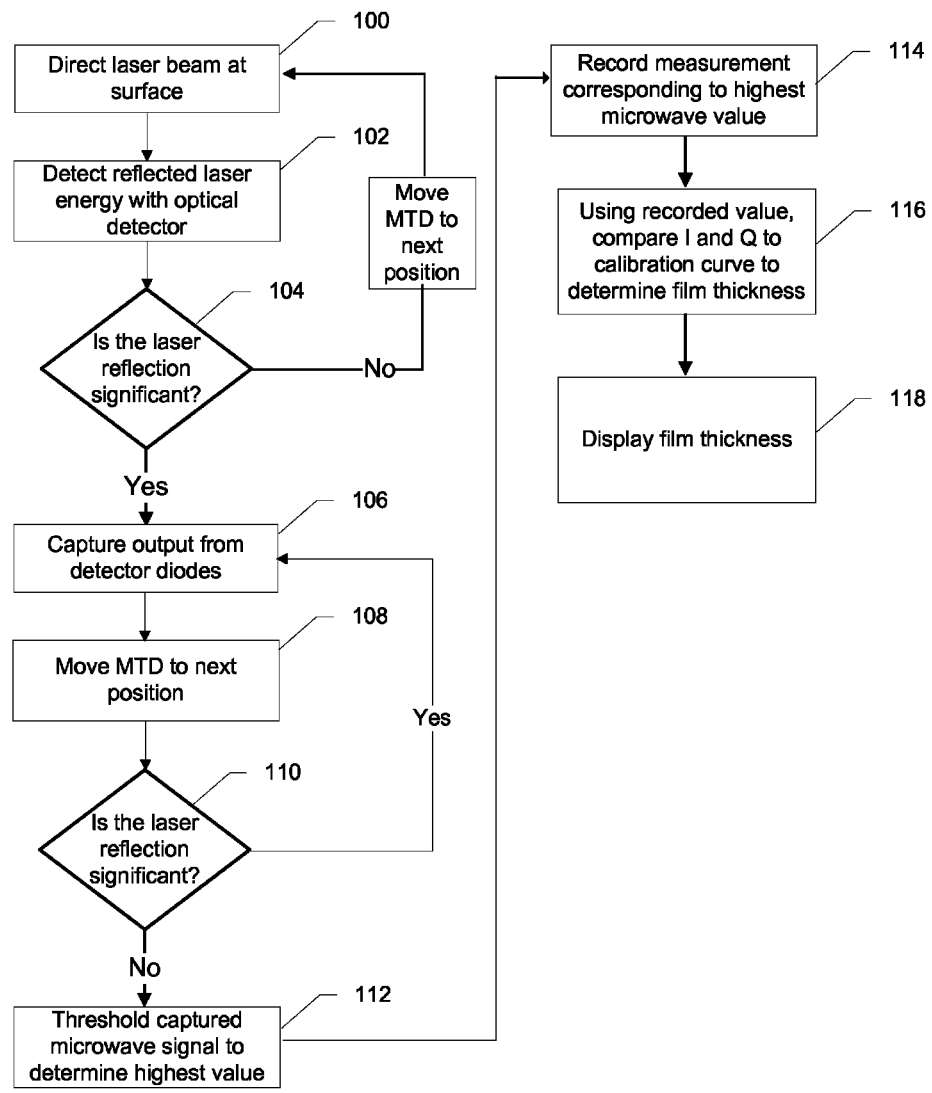
FIG. 5 is a flowchart showing the required steps for using a microwave thickness detector according to a preferred embodiment of the present invention.

FIG. 5 is a block diagram showing the process of determining film/coating thickness using the MTD of FIGS. 4A and 4B. It should be noted that, while the flowchart shown in FIG. 5 breaks down the process for individual movements of the MTD from one position to the next, the steps shown in FIG. 5 will typically be performed as the MTD is rocked continuously through its range of motion without stopping at different positions. During operation, in step 100, a laser beam is produced by a suitable component such as a laser diode (illumination source). The laser beam reflects off of the target surface at an angle equal to the angle of incidence at the surface tangent of the target. In step 102, the optical detector detects any light (laser) energy that reaches the detector. When the vertical axis of the MTD is not perpendicular to the target surface, as shown in FIG. 4A when midpoint 418 is not perpendicular to surface 150, the laser beam will reflect off of the surface at an angle, 0, that does not result in the beam striking the detector. Thus, the energy detected by the optical detector will not be significant (step 104), and the process flow of FIG. 5 returns to step 102.

As the MTD is rocked through the full range of motion, at some point the angle of reflection will be such that some or the entire reflected beam will strike the illumination detector as shown in FIG. 4B when midpoint 418 is perpendicular to surface 150. The reflected light is gathered by optics and focused on an optical detector which converts light intensity to an analog or digital electrical signal. When the reflected laser energy is detected by the optical detector (step 104), the process moves to step 106 and the output from the detector diodes is captured.

The microwave signal will rise and fall as the MTD continues to move through a full range of motion and the microwave beam approaches perpendicular, reaches perpendicular, and then moves past perpendicular. If more positions are to be measured, the MTD is then moved to a subsequent position in step 108 to repeat the processes of capturing the output in step 106 after determining that laser reflection is significant in step 110. As long as significant laser reflection is being detected (shown by steps 104 and 110) the detector output is captured. In step 112, the microwave signal is thresholded to a value to determine when the signal is the highest. At that time, the microwave beam will typically have been perpendicular to the surface of the substrate (when the MTD is used as shown in FIGS. 4A-4B). In step 114, the optical detection components then send a signal to the circuitry 310 to record the measurement of the microwave assembly 305 that corresponds to the highest signal intensity. In this fashion, it is determined that the microwave device is perpendicular to the surface and the microwave reading at that moment is recorded, although the microwave assembly may be sending and receiving measurement information prior to and after the recording step. In step 116, the measurement of the microwave assembly at that point (the highest value) is then translated into a measurement of thickness, based on a previously prepared calibration curve as described below. Finally, in step 118, the coating thickness is displayed.

To this end, the MTD 200 (referring to FIG. 2) also preferably includes display(s) 215 and LED indicators 202, which can be integrated into housing 201. The housing 201 can also contain components for producing an audible alarm. This housing 201 can protect and shield the internal components, such as the microwave assembly 305 shown in FIG. 3A, and is preferably rigid, strong, and large enough to hold the entire tool assembly 230. As is described in greater detail below, the handle 207 can house a measurement button 203 that when depressed allows a user to select certain functions or operations. A power switch 206 is also preferably provided, as well as an indicator LED 204 to indicate that the inspection tool is on.

A preferred rocker has a rounded base as shown and is easy to move in a rocking motion. The handle 207 can be integrated into the housing 201 in manner shown in the figure. The handle 207 allows an operator to easily guide the inspection tool 200 along the surface of a target. The correct balance of weight, size, and moment between the handle 207, housing 201, microwave assembly 305 and detection circuitry 310, and optical alignment system 314, 312 can impact the ability of a unit to scan quickly and comfortably.

The housing 201 has a number of functions. It provides the structural support for the entire assembly, protects the microwave transceiver, and can contain the wiring and connections to the handle, detection/display circuitry and any power supply associated with the unit. The housing 201, along with curved lower surface 216, places the microwave assembly 305, optical detector 312, and illumination source 314 at a constant, preferably optimal, orientation with respect to the inspection area.

Standoff distance in an open-ended waveguide is essentially a tuning parameter, and the output of a measurement device varies as standoff is changed. The optimum standoff distance for maximizing reflected signal amplitude dynamic range can be determined experimentally for a given measurement device. For example, Applicants determined that, for a preferred embodiment of the present invention, a 3 mm standoff produced the highest signal to noise ratio for a K band device. The standoff optimization was repeated after frequency tuning voltage was added, but the value for maximizing signal to noise remained at 3 mm. Once optimal standoff distance is determined, the standoff distance is preferably maintained by the contact between the scanning rocker assembly and the target surface. In some preferred embodiments, the standoff distance can be changed by adjusting the location of the microwave assembly 305 within the MTD device. Alternatively, the scanning rocker itself can be mechanically moved relative to the rest of the housing. Further, standoff distance can be adjusted by adding or removing material to or from the curved lower surface 216 to adjust the distance between the microwave assembly and the target surface.

A visual and/or audible alarm/indicator circuit (not shown, but generally known in the art) can be designed and built to interpret the output of the MTD sensor, and would be useful for thickness evaluation. Through filtering, automatic gain control (AGC), and classic signal processing/display circuitry, the accuracy of measurement is enhanced. Generally the signal to noise ratio associated with thickness detection is directly proportional to the difference between the uncoated background and the signal from the coated substrate.

The display 215 can be, for example, a digital numeric or a light bar indicating thickness. A digital numeric display can include scrolling text that provides information or instructions. A light bar series may also be used in which the number of lights turned on gives an indication of the thickness. Alternatively, a simple 3-light LED 204 (as shown in FIG. 2) may be used to indicate, for example, that a measurement reading has been successfully acquired. The LED 204 or display 215 (or alternatively audible alarms not shown) can also indicate if the thickness is out of specification, or whether or not a reading can be taken (for example, if the battery power is too low to take a reading). The device could also include an output port for recording the data as it is collected. In some embodiments, data could be transmitted wirelessly—although a hard-wire connection may be preferable for security purposes.

It should be appreciated by those skilled in the art that more elaborate information displays and data enabling technology can also be incorporated into embodiments of the invention without departing from the scope and teaching of the invention. For example a microprocessor and liquid crystal display could enable additional data processing and provide visual assessment capabilities to a user of the invention; however, additional user interface technology such a microprocessors and screen displays add cost and weight to the overall device. The device can also record results utilizing memory technology (device-based or removable) also well known in the art. Standard K, Ka, Ku, and W band transceivers can be considered as a commodity part of the device and some are widely known and used, for example, in police radar guns and automatic door openers.

Power requirements can be expected to be on the order of 5 V and under 1 watt, and could be provided by batteries that would preferably allow periods of operation to 8 hours. This power requirement is well within the range of modern rechargeable tool technology. A simple 110 V line cord can be used as a reliable, low cost option, and would eliminate recharge down times, but would also limit mobility.

The housing 201 can also include shielding to prevent stray microwave radiation. Commercially available transceivers, such as police radar transmitters, will typically have passed UL shielding tests in other applications. The transmitters are low power devices, typically on the order of $\frac{1}{100}$ to $\frac{1}{1000}$ as powerful as a microwave oven. Housing 201 materials can include integral shielding materials such as a copper weave or similar approach. The invention is not limited to any particular form or scanning format.

In preferred embodiments of the present invention, an optional marking device can allow the operator to mark areas where thickness is outside a specified range. Such functionality could be provided, for example, by inking or tagging mechanisms integrated near the assessment area (the area where the microwave signal strikes the target surface). This provides an accurate location for the device at the time of the marking device actuation, possibly through the use of a template to locate the transceiver/antenna center, and is useful for locating points in the substrate under a smooth coating such as bolt heads, rivets, and fasteners. In a preferred embodiment the marking system consists of two plotter pens actuated by solenoids near or on either side of the midpoint of the curved lower surface. In another preferred embodiment of the present invention, measurements taken by the MTD can include time/spatial thickness measurement data that can be uploaded to a computer storage device (e.g., ROM, USB drive or magnetic diskette) readable by a programmable computer.

Figure 6:
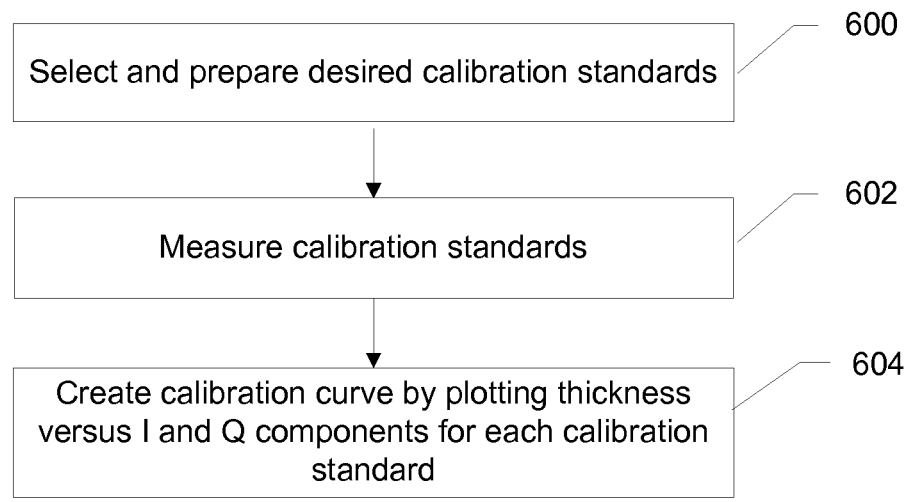
FIG. 6 is a flowchart showing the steps in performing a calibration of a microwave thickness detector according to a preferred embodiment of the present invention.

The MTD can be calibrated using a set of known calibration standards. FIG. 6 shows the steps in a calibration process according to a preferred embodiment of the present invention. In step 600, a set of calibration standards is prepared, for example, by selecting and measuring several films of known thicknesses. The thicknesses of the calibration standards preferably cover the thickness range of interest in the measurements. The film thicknesses of the calibration standards can be accurately determined using, for example, a cam gauge. The number of calibration standards and thickness values of the calibration standards within a set will vary with the type of material and the accuracy required of the measurements. Because different coatings having different dielectric properties and different structural materials have different microwave reflectivity, depending on the composition and surface roughness, the best accuracy is achieved by producing a set of calibration standards for each different type of coating and underlying structural material to be measured. It has been determined, for example, that MYLAR sheets of predetermined thickness may be used for calibration because the MYLAR material is transparent to the microwave energy in much the same way as are many typical coatings to be measured. Skilled persons can readily determine the necessary make-up of a set of calibration standards based upon the desired or expected thicknesses of the film/coating being measured. For example, in a typical thick coating application, samples are prepared within the 0 to 50 mil range in 3 to 4 mil increments.

After a set of calibration standards is prepared, the calibration standards are measured in step 602, using the microwave measurement techniques described above, to prepare a ground truth table and/or a derived interpolation function to correlate microwave readings to film thickness. An interpolation function is a mathematical relationship based on the calibration data and provides thickness values from the measured parameters. In a typical calibration process of a preferred embodiment, a film of known thickness is measured (preferably over a substrate similar to the target substrate) and any deviation is calculated and accounted for. A film of another known thickness is measured next. These steps are reiterated until a library of calibration data is compiled for different films, underlying structural materials, and stand-off distances.

The correlation data can then be stored and compared to the data obtained during a coating thickness measurement to compute coating thickness. Thus, in step 604, the thickness of the calibration standards is plotted against the amplitude of the in-phase component of the reflected wave on one axis and the quadrature component of the reflected wave on the other axis to create a calibration curve that can be used to determine layer thickness for unknown samples. The plot, in some embodiments, approximates the shape of an eccentric spiral. The in-phase and quadrature components of the reflected wave are measured for a work piece having a film of unknown thickness, and the in-phase and quadrature components are then plotted to determine the closest point on the calibration curve to determine the actual film thickness. The calibration curve need not be defined by a single mathematical expression for all regions; different curves can be used to fit different parts of the data. For a given sample type there is a unique I and Q combination corresponding to each film thickness.

By using calibration standards of the same material as the coating to be measured over the same substrate material to determine an empirical relationship between the microwave measurements and thickness, these embodiments do not rely as heavily on assumptions about the position of sensors or about the physical properties of the film as prior art methods. Accordingly preferred embodiments of the present invention are more accurate than prior art methods that exclusively use mathematical models based on a specific function of the reflected signal.

Figure 7:
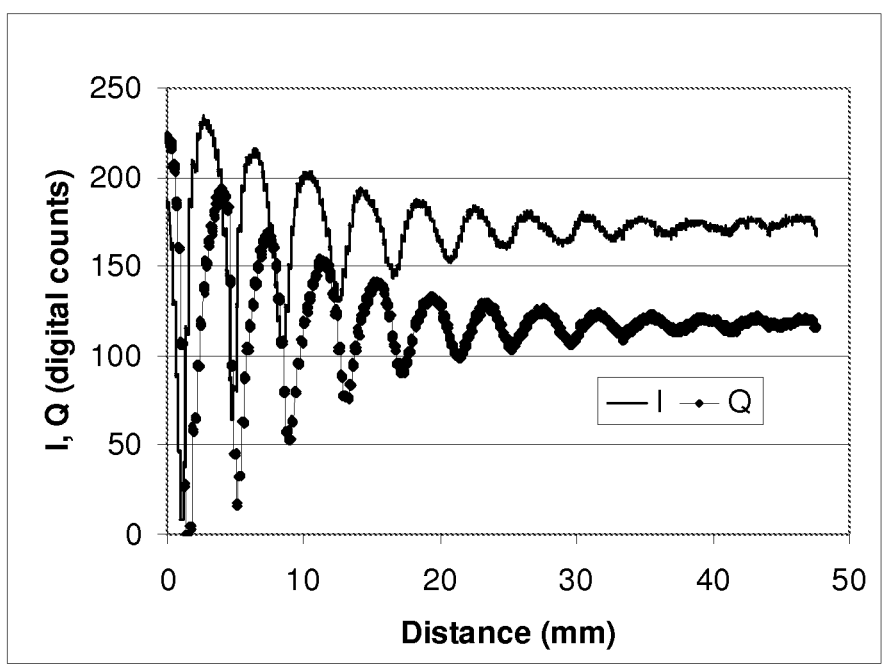
FIG. 7 is a graph of distance as a function of I and as a function of Q of the reflected wave according to a preferred embodiment of the present invention.

FIG. 7 shows an example of a calibration curve for a typical microwave thickness measuring device according to the present invention. The calibration curve is derived by setting the microwave receiver at known distances from a bare metal surface, measuring "I" (the in-phase output) and "Q" (the quadrature output) of a microwave transceiver as a function of distance from the surface, and then plotting I and Q as a function of the distance from the metal surface. A best-fit curve is then determined from the measurement points to characterize the relationship of I and Q with distance. The curves can be derived in part from the calibration measurements and in part by mathematical modeling. Different parts of the curve can be modeled using different equations, or a single equation can characterize the curve over its entire useful range. In making the measurements to produce the calibration curves, the desired distance from the metal substructure can be established by using shims of a low dielectric constant material or by using actual coatings of the same material as that which will be measured. Because the dielectric properties of the coating can affect the results, it is preferable to use actual coatings.

As shown in FIG. 7, as the transceiver moves away from the metal surface, the I and Q components each vary similar to damped sinusoidal functions. The use of calibration standards improves the accuracy of the mathematical modeling by substituting empirical measurements for assumptions about the system. The curve of FIG. 7 shows that a specific distance produces one and only one I, Q pair, for at least the first several cycles of the sinusoid, that is, distance is not a function of I or Q alone, but of both.

Figure 8:
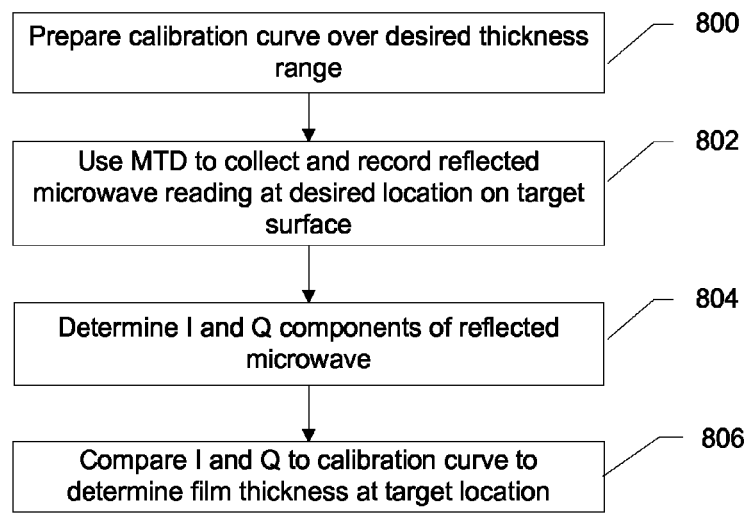
FIG. 8 is a flowchart showing the steps of determining film/coating thickness using the calibration data of FIG. 7.

FIG. 8 shows a preferred method of using the calibration curve of FIG. 7 with an MTD according to the present invention to determine film thickness. In step 800, calibration curves, such as those in FIG. 7, are created as described above with reference to FIG. 6. In step 802, the MTD device is rocked against the surface of the layer to be measured while the microwave assembly is transmitting and receiving. The microwave reading is recorded at the moment where the optical detection assembly indicates that the microwave assembly is perpendicular to the surface. It is preferred that the stand-off distance is set to the same standoff distance that was used to derive the calibration curve, although a different standoff value can be used and compensated for mathematically.

The recorded microwave reading is used to calculate the I and Q components of the reflected wave in step 804. In step 806, the I and Q components are compared with the calibration data to determine the coating thickness. A proximity algorithm can be used to locate the nearest point on the calibration spiral to produce an estimate of the coating thickness. The resolution of this technique is expected to be approximately ±0.5 mil (0.013 mm) using the methods described above.

The thickness range covered by this technique can be varied by selecting a band and/or antenna suitable for the desired thickness range. For example, higher frequencies can be used to determine spirals to cover the 0-5 mil (0-0.13 mm) range, and lower frequencies can be used to cover thickness ranges in excess of one inch. As is known in the art, for a given I, one can find several corresponding thicknesses. It can be seen in FIG. 7, however, that a calibration-based algorithm can be developed based on phase angle for coating thicknesses from roughly 4-40 mils (0.1-1 mm). For thicknesses greater than about 40 mils, the phase angle versus coating thickness curve is periodic, and it becomes more difficult to uniquely determine a film thickness from the phase angle measurement. The thickness range of 4-40 mils (0.1-1 mm) is a range of interest for many coatings, and a simple curve fit to a parabolic shape for the phase angle versus distance curve of FIG. 7 provides an easily implemented algorithm for determining film thickness.

Figure 9:
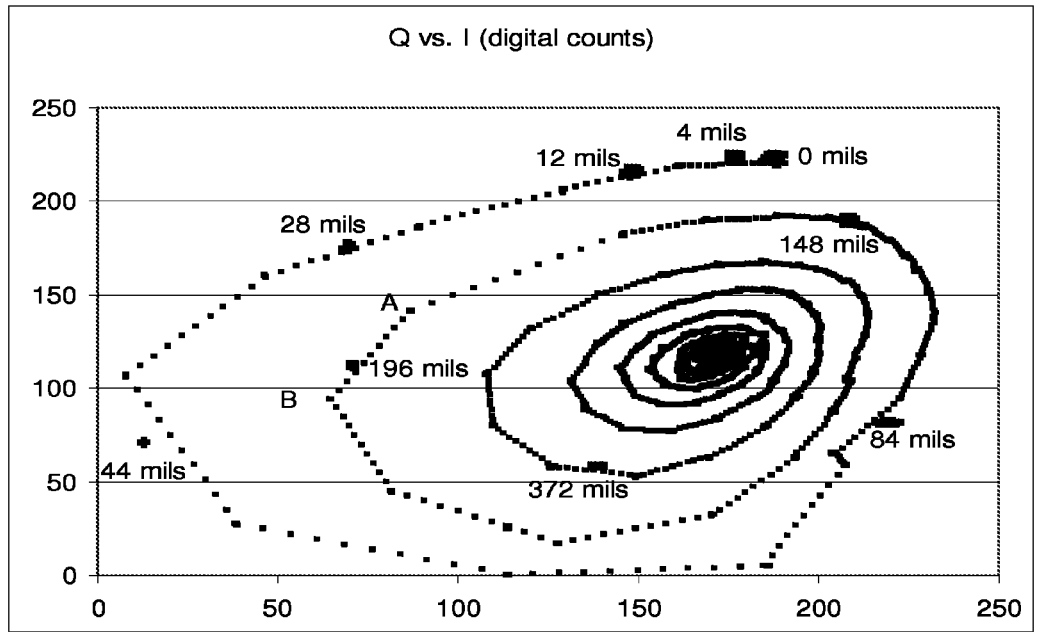
FIG. 9 shows a calibration curve according to a preferred embodiment of the present invention with thickness plotted against I and Q.

There are a number of applications where measurement of thicker coatings is needed. Examples include space shuttle thermal protection materials, insulation on pipes, and thick polymer coatings. Because the reflected wave phase angle is a periodic function, a phase angle measurement can correspond to more than one coating depth on the calibration curve. One solution is based on a plot of coating thickness versus Q and I. This produces a spiral in Q, I space as seen in FIG. 9. Each point in the spiral includes a step of 8 mils in thickness in the example measurement. As the thickness of a low dielectric strength coating is increased to roughly 2 inches (5.1 cm) the spiral continues to curl in upon itself. The center of the spiral represents a distance so far from the reflector that the I, Q values at that point are the same as when the transceiver is pointed to open air. For a given I, Q combination, a unique thickness value on the curve can be determined. FIG. 9 shows calibration data measured at 0, 4, 12, 28, 44, 84, 148, 196, and 372 mils (0, 0.1, 0.3, 0.7, 1.1, 2.1, 5, and 9.5 mm) with thickness plotted against I and Q, and a spiral calibration curve superimposed onto the measurements. Each marked data point is actually a collection of roughly 200 individual samples of I and Q, with each measurement individually plotted to provide an indication of the uncertainty associated with system noise. The spread of these data (which show up as dark spots with a thickness value on the plot,) appear to be small compared to the spiral arm separations until very large coating depths are measured (toward the center of the spiral).

As an example, the points marked A and B on the curve are 192 and 200 mils (4.9 and 5.1 mm), respectively, and the 196 mil (5 mm) data point falls roughly midway between them. The approach of plotting thickness against I and Q has a number of advantages:

Coating thickness measurements in excess of ½ inch (1.27 cm) are uniquely determined on the I vs. Q calibration curve.

A simple field calibration to determine thickness is possible. The center of the spiral is effectively at an infinite distance from the substrate—and the I, Q value to locate this center is easily determined by measuring I and Q in free space. These data can then be translated to put the center of the spiral at the origin.

The spiral shape of the calibration curve can often be expressed analytically with a three parameter fit (two for the basic spiral shape, one for the cant angle of the spiral—similar to a canted parabolic fit). As a result, the calibration spiral can be stored with 3 numbers and an equation, making correlation between the measurement and thickness readily calculated by an on-board processor. Alternatively, a look-up table can be stored and an interpolation algorithm can be used for measured values in between table values. This approach has been successful using cubic splines as an interpolating scheme.

While embodiments of the present invention are shown with a microwave transceiver directing microwaves essentially normal to the target surface, the invention could also be implemented with a separate microwave transmitter and receiver, with non-normal angles of incidence and reflection. The optical detection components described above could be used in a similar fashion to ensure a consistent measurement angle (even where the angle is not perpendicular) by determining when the desired measurement angle has been achieved and recording the microwave reading at that position. Also, while the embodiments shown herein have been described for determining coating thickness, most embodiments can also be used in a similar fashion to determine the dielectric properties of the coatings when thickness is known.

The terms "film," "coating," and "layer" are used interchangeably herein to mean any layer or covering on the surface of a target (such as paint, appliqué, an oxide layer, etc.) however such a layer is formed on the surface. The term "paint" as used herein includes any type of coating, including, but not limited to conventional paints, high metallic content coating, and polymer coatings, such as appliqués. The terms "quadrature component," "quadrature output," or "Q" refers to a component that is shifted ninety degrees from a reference signal, typically the primary signal, whereas the plural term "quadrature components" typically refers to the set of in-phase and ninety degree shifted components. The term "curve" is used to indicate a relationship between variables, and is not limited to a line plotted on a graph, but can include a table, formula, or other method of expressing the relationship.

The invention is not limited to any specific radiation frequency and can use, for example, K, Ka, Ku, W and X microwaves. While some embodiments of the invention can be implemented with standard, off the shelf microwave components, a preferred embodiment for film thickness measurement uses a Ka-band microwave transceiver mounted directly to a machined slot antenna, with a daughter board that provides signal conditioning and includes isolation coils to protect the transceiver diodes from electrostatic damage. The transceiver typically provides two low power outputs corresponding to I and Q, while providing the daughter board on the sensor unit reduces the lead length and mutual interference, which reduces system noise.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. An apparatus for nondestructive measurement of a property of a target, the target including a substrate and a coating on the substrate, and the property being the thickness of the coating, the apparatus comprising:
   a housing containing a first sensor including a microwave transmitter for producing a primary beam of microwave energy, a waveguide for directing said primary beam of microwave energy towards the target, and a detector for receiving microwave energy reflected from said target;
   an alignment system for producing a signal when the orientation between the beam of microwave energy and the target surface is at a predetermined angle; and
   an analyzer for determining the thickness of the coating on the substrate by measuring components of the reflected microwave energy when the orientation between the beam of microwave energy and the target surface is at the predetermined angle
   wherein the housing has a curved lower surface for contacting the target surface while the primary beam of microwave energy is directed toward the target and wherein the housing can be moved through a range of motion while the curved lower surface is in contact with the target surface so that the angle between the beam of microwave energy and the target varies through a range of angles, said range of angles including the predetermined angle; and
   wherein the alignment system comprises an illumination source for directing illumination towards the target surface and an optical detector for detecting illumination reflected from the target surface and wherein the alignment system is oriented so that when the housing is moved through said range of motion while in contact with the target surface, the optical detector detects a maximum amount of illumination reflected from the surface when the orientation between the beam of microwave energy and the target surface is at the predetermined angle.

2. The apparatus of claim 1 in which the predetermined angle comprises a 90 degree angle between the primary beam of microwave energy and the target.

3. The apparatus of claim 1 in which alignment system produces a signal when the beam of microwave energy is perpendicular to the target surface and in which the analyzer determines the thickness of the coating on the target substrate by measuring components of the reflected microwave energy when the signal is produced.

4. The apparatus of claim 1 in which the housing has a vertical axis and in which the primary beam of microwave energy is directed toward the target surface along said vertical axis.

5. The apparatus of claim 1 in which the illumination source is a laser.

6. The apparatus of claim 1 in which the optical detector includes a multifaceted polygonal minor, focusing optics, and a detector.

7. A method for nondestructive measurement of a property of a target, the target consisting of a substrate and a coating on the substrate, and the property being the thickness of the coating, the method comprising:
   providing a microwave thickness detector including a housing containing a microwave transmitter for producing a primary beam of microwave energy, a waveguide for directing said primary beam of microwave energy towards the target, a detector for receiving microwave energy reflected from said target, an alignment system for maintaining a constant measurement angle by determining when the primary beam of microwave energy is at a predetermined angle with the target, and an analyzer for determining the thickness of the coating on the substrate by measuring components of the reflected microwave energy, said housing having a curved lower surface for contacting the target surface while the primary beam of microwave energy is directed toward the target surface;
   bringing the curved lower surface into contact with the target surface;
   directing the primary beam of microwave energy toward the target;
   rocking the housing along the curved lower surface of the housing from one side to the other so that the primary beam of microwave energy passes through a range of angles relative to the target surface, said range of angles including said predetermined angle;
   determining with the alignment system when the primary beam of microwave energy is at the predetermined angle with the target;
   measuring components of the microwave energy reflected from the surface and received by the detector when the primary beam of microwave energy is at the predetermined angle; and determining the thickness of the coating on the target substrate from said measured components of the reflected microwave energy.

8. The method of claim 7 in which the alignment system comprises:
- an illumination source for directing illumination towards the target surface; and
- an optical detector for detecting illumination reflected from the surface when the orientation between the beam of microwave energy and the target surface is at the predetermined angle.

9. The method of claim 8 in which determining with the alignment system when the primary beam of microwave energy is at the predetermined angle with the target comprises:
- directing an optical beam from an illumination source contained in the housing assembly toward the surface while rocking the housing; and
- detecting the reflected optical beam returned from the target surface to determine when the primary microwave beam is at the predetermined angle with the target.

10. The method of claim 7 in which determining the thickness of the coating on the target substrate from said measured components of the reflected microwave energy comprises:
- comparing the measured components of the reflected microwave energy to stored calibration data; and
- determining a thickness value of the coating.

11. The method of claim 10 in which the stored calibration data comprises measured components of the reflected microwave energy from a plurality of calibration standards, each having a known thickness, over a range of thicknesses, the range including the thickness of the coating for which the thickness value is to be determined.

12. The method of claim 11 in which the stored calibration data is determined using a microwave thickness detector having the same standoff distance and the same measurement angle as used for determining the thickness of the coating on the target substrate.

13. The method of claim 11 in which the measured components of the reflected microwave energy include an in-phase component of the reflected wave and a quadrature component of the reflected wave, and in which determining a thickness value of the coating comprises plotting the in-phase component of the reflected wave on one axis and the quadrature component of the reflected wave on the other axis to create a calibration curve that can be used to determine coating thickness on the target substrate.

14. The method of claim 7 in which predetermined angle is perpendicular to the target surface.

15. The method of claim 8 in which the illumination source is a laser.

* * * * *